(12) United States Patent
Kaufmann

(10) Patent No.: US 7,125,487 B1
(45) Date of Patent: Oct. 24, 2006

(54) OIL WASTE AND TOXIC COMPOUND SEPARATOR

(76) Inventor: Roy Kaufmann, 1616 No. Pacific Coast Hwy., Long Beach, CA (US) 90810

( * ) Notice: Subject to any disclaimer, the term of this patent is extended or adjusted under 35 U.S.C. 154(b) by 0 days.

(21) Appl. No.: 10/858,608

(22) Filed: Jun. 2, 2004

Related U.S. Application Data

(60) Provisional application No. 60/474,346, filed on Jun. 2, 2003.

(51) Int. Cl.
*C02F 1/28* (2006.01)
*C02F 9/00* (2006.01)
(52) U.S. Cl. ...................... 210/170; 210/259
(58) Field of Classification Search ............... 210/663, 210/691, 693, 747, 170, 259, 908, 924
See application file for complete search history.

(56) References Cited

U.S. PATENT DOCUMENTS

| | | | |
|---|---|---|---|
| 6,533,941 B1* | 3/2003 | Butler | 210/681 |
| 2003/0089652 A1* | 5/2003 | Matsui et al. | 210/163 |

* cited by examiner

*Primary Examiner*—Ivars C. Cintins
(74) *Attorney, Agent, or Firm*—Charles H. Thomas

(57) ABSTRACT

A waste product separator includes a plurality of plate gussets which support a top cover plate. Each gusset has opposite ends with an interconnecting declining edge extending from the top plate to the roadway. The respective edges further support a first ramp and a second ramp. Each ramp includes elongated slots so that onrushing waste water flows through the first ramp followed by discharge through the slots of the second ramp. Collection sections are under the top cover plate and in the path of the oncoming rush of waste water and each section includes an oil absorption unit and a toxic waste or product unit so that the waste water must filter through these units to reach a discharge ramp. The units serve as a catch basin for retaining trash.

11 Claims, 1 Drawing Sheet

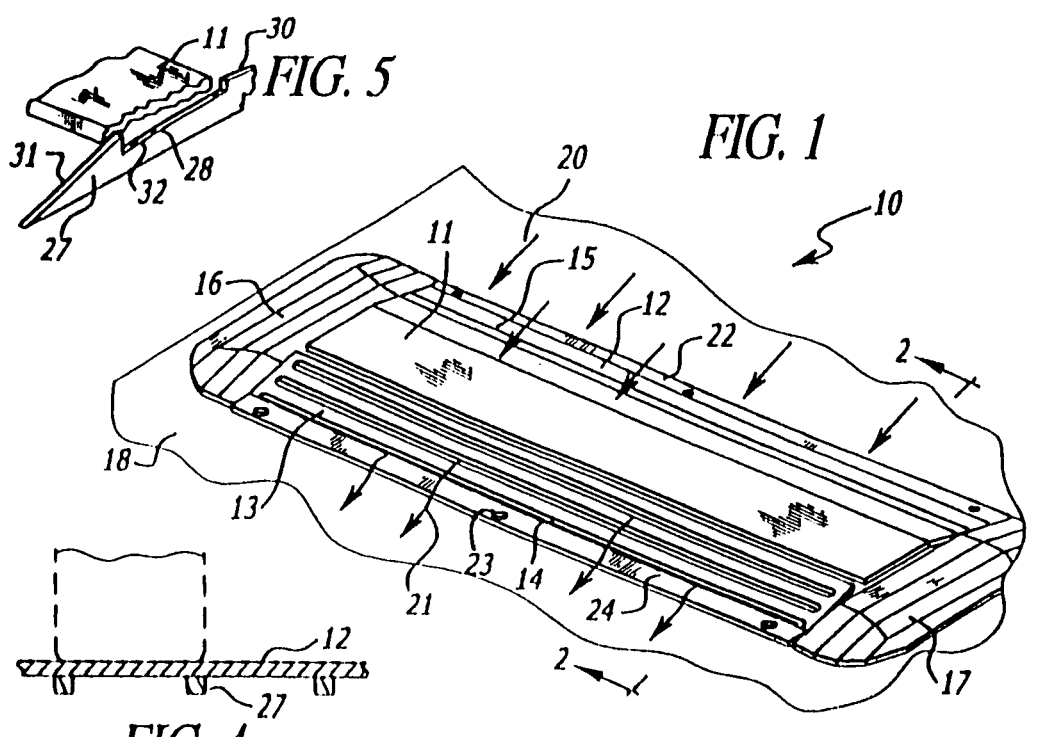
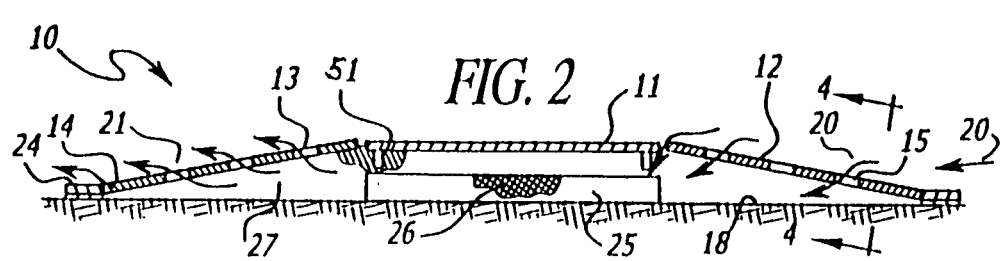
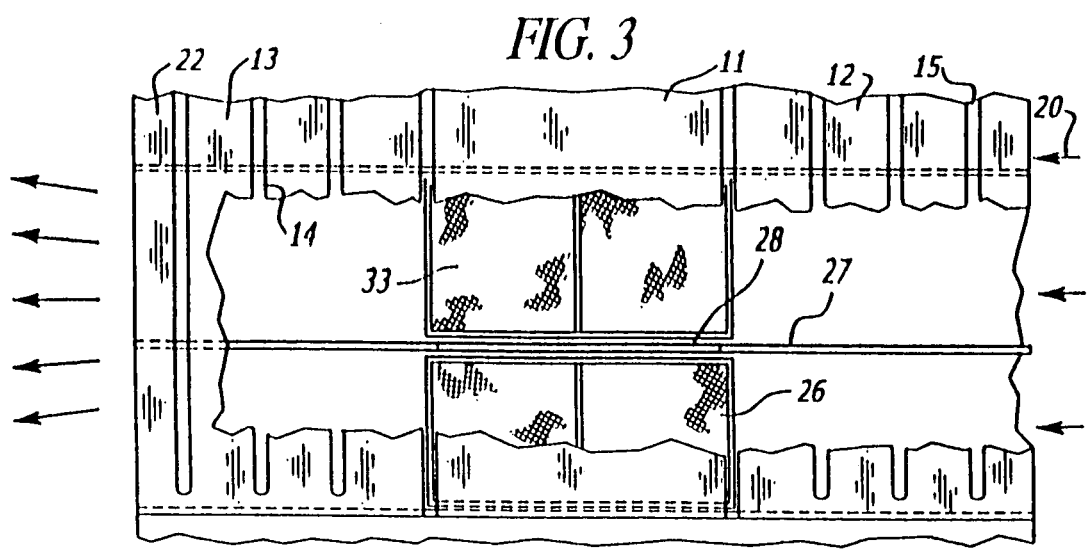

OIL WASTE AND TOXIC COMPOUND SEPARATOR

Priority claimed on Ser. No. 60/474,346 filed Jun. 2, 2003 pending.

BACKGROUND OF THE INVENTION

1. Field of the Invention

The present invention relates to the field of oil and toxic waste separators, and more particularly to a novel roadway separator for processing waste water through a petroleum products separator in a toxic material collection apparatus for absorbing oil products and filtering toxic compounds while discharging cleansed water from the apparatus.

2. Brief Description of the Prior Art

In the past, there has been the conventional practice to permit waste water to run along the curbs of a roadway for collection in storm drains and for conducting the waste water to storage reservoirs or the like. Normally, such waste water is contaminated with a variety of petroleum products, as well as with toxic materials. Problems and difficulties have been encountered with such a conventional practice from the ecological standpoint due to the fact that the petroleum products and toxic materials are detrimental to a variety of health and environmental conditions. The usual waste water contains such toxic substances as pesticides, herbicides, synthetic organic compounds and other pollutants while the petroleum products generally consist of oil residue or the like.

Therefore, a long-standing need has existed to provide a roadway apparatus for receiving waste water as it runs down a driveway or roadway so that the petroleum and toxic materials can be separated from the water whereby relatively clean water is discharged from the apparatus and the petroleum and toxic materials are collected and stored within the apparatus for subsequent removal. Heavy solids may also be collected as they can be dropped via gravity into absorbent materials carried within the apparatus as well as the oil and toxic material products.

SUMMARY OF THE INVENTION

Accordingly, the above problems and difficulties are avoided by the present invention which provides a roadway separator or apparatus which includes a plurality of separator plate gussets that are arranged in fixed, parallel, spaced-apart relationship across the length of the apparatus. Each separator gusset includes a central recess or notch so that a top cover plate can be mounted in the respective recesses and supported by the plurality of gussets. Each gusset has opposite ends separated by the central recess with an inclining edge on one end and a declining edge at its other end. The respective including and declining edges support a first or inlet ramp and a second or outlet ramp respectively. Each of the ramps is provided with elongated slots communicating with the interior of the apparatus so that when the apparatus is placed on a roadway, onrushing waste water will flow through the first ramp into the interior of the apparatus followed by exiting or discharge through the slots of the second ramp. The interior of the apparatus is provided with collection and/or filtering sections directly under the top cover plate and ramp so as to be in the path of the oncoming rush of waste water. Each section is occupied by an oil absorption or filter unit and a toxic waste or product unit so that the waste water must flow through these units to reach the discharge ramp. The oil absorption unit and the toxic filter unit will serve as a catch basin for retaining trash or other suspended solids in addition to oil absorption and filtering of toxic waste. A ground plate may be employed for supporting the apparatus directly on the surface of a roadway or driveway and the top cover plate is removably mounted on the plurality of gussets so that ready access is gained to the oil absorption units and the toxic filters for cleaning, replacement or maintenance purposes. The inclining and declining ramps and the cover plate provide a speed bump as well as permitting passage of vehicles over the apparatus.

Therefore, it is among the primary objects of the present invention to provide a novel separator apparatus for use on a roadway for processing waste water so as to remove contaminants such as petroleum products, toxic materials or solid waste from waste water or the like.

Another object of the present invention is to provide an oil absorption and toxic material filtering unit which is carried in an apparatus disposed on a roadway in the line of traffic which will readily accept drainage or waste water in order to remove oil and toxic materials therefrom permitting discharge of relatively clean water.

Yet another object of the present invention is to provide a novel roadway "mat" disposed on a street or driveway in line with onrushing waste water and which includes oil absorption units and toxic material filtering units which will remove contaminants from drainage water resulting in discharge of relatively clean water.

Still a further object resides in the provision of a drainage water filtering and contaminants removal apparatus disposed in a roadway and having inclined slotted inlet ramps for introducing the drainage water into a filtering and contaminant removal section or unit for discharge of cleansed water via declining slotted discharge or outlet ramps.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 1 is a perspective view illustrating the novel oil waste and toxic compound separator incorporating the present invention;

FIG. 2 is an enlarged transverse cross-sectional view of the separator shown in FIG. 1 as taken in the direction of arrows 2—2 thereof;

FIG. 3 is a fragmentary view in top plan orientation of the separator shown in FIGS. 1 and 2;

FIG. 4 is a fragmentary view, in section, of the separator shown in FIG. 2 as taken in the direction of arrows 4—4 thereof; and FIG. 5 is an exploded perspective view of the top plate and a selected one of the gussets used in the separator shown in FIGS. 1–4 inclusive.

DESCRIPTION OP PREFERRED EMBODIMENT

Referring to FIG. 1, the novel oil waste and toxic compound separator is illustrated in the general direction of arrow 10 which includes a covering top plate or panel 11 and a first incline ramp 12 on one side of the top panel 11 and a second decline ramp 13 on the opposite side of the top panel 11. Each of the respective incline and decline panels includes a plurality of openings or elongated slots, such as slot 14 illustrated in connection with decline panel 13 and slot 15 illustrated in connection with the incline panel 12. Right and left end sections are illustrated by numerals 16 and 17 respectively and are illustrated as declining from the opposite ends of top panel 11 to ground level 18. It is to be understood that the ground level 18 is a roadway and that the apparatus 10 is intended to be placed on the roadway and that it will accommodate traffic there over. Since the top panel 11 is elevated from the roadway surface, the entire apparatus may be considered to function as a speed bump in addition to its environmental purposes.

Such purposes include placing the apparatus 10 in a position on the roadway 11 so as to interfere with the flow of drain or waste water that will be conducted along the roadway in the direction of the arrows, such as arrow 20. The onrushing waste water will enter the elongated slots, such as slot 15, in the incline ramp 12, and the waste water is thus introduced into the interior of the apparatus for cleansing. The water is then discharged or exited from the apparatus from the declining ramp 13 in the direction of the arrows, such as the arrow indicated by numeral 21. A ground plate 22 may be included for supporting the apparatus on the roadway surface and may be fixedly attached to the roadway surface by a plurality of spaced-apart bolts or fasteners, such as bolts 23. The opposite edges of plate 22 may include surface areas on which advertising, special notices or the like may be carried in the form of graphic representations, indicia or alpha/numeric characters and such an area is indicated by numeral 24 on the side of plate 22. The area is visually exposed and the ramps 12 and 13 do not interfere with the visual observation of the indicia carried thereon.

It is intended that the apparatus 10 be placed on the roadway 18 and that oncoming traffic will encounter the incline ramp 12 and cross over the top panel 11 and descend on the declining ramp 13. In this way, the apparatus serves as a speed bump, but the prime purpose is for cleansing of waste water which normally flows along the roadway.

Referring in detail to FIG. 2, it can be seen that the apparatus 10 is placed on the surface of roadway 18 which may be flat or at an incline. Water carrying waste products, as indicated by numeral 20, encounters the apparatus and progresses up the incline ramp 12 where it flows through the plurality of elongated slots 15. Once the water passes through the slots, the water will travel over oil separation units and toxic material filters. Such a filter is indicated by numeral 25 and is disposed immediately below the top panel 11. A space resides between the undersurface of the panel 11 and the filter unit 25 in which debris can accumulate for subsequent disposal. However, toxic or pollutant materials in the water will pass through or be encountered by the filter 26 in the unit 25. The flow of water will exit through the slots in decline panel 13 vis slots 14 and such water will be relatively clean and cleansed from pollutants.

It is to be understood that the ramps 12 and 13 as well as the top panel 11 are mounted on a support base having a plurality of gussets such as gusset 27. The gussets are arranged in fixed, spaced-apart parallel relationship, as shown in FIGS. 3 and 4. Each of the respective gussets includes a notch or recess 28 as shown in FIG. 5 for accommodating the width of the top panel 11 in order to support and elevate the panel above ground level. The bottom of each of the respective gussets resides on the roadway surface or on the ground plate 22. Each gusset 27 is provided with an incline edge or surface 30 and a declining edge or surface 31 along the upper edge separated by the notch 28 in order to support the respective incline ramp 12 and decline ramp 13. The ramps may be suitably fixed to the respective edges of the gusset by welding or other suitable means. However, the panel and ramps may be selectively removable to provide access to the cleansing and filtering units. The top panel 11 may be held in position on the respective gussets by means of pins, such as pin 51, carried on the edge marginal regions of the sides of the top plate or panel. The guide or support pins 51 are adapted to be inserted into mating holes 32 in the edge of the gusset plate within the notch 28. FIG. 5 indicates the receiving hole for the pins, identified by numeral 32. The guide pins and holes serve as a means for removably retaining the top plate or panel 11 in position on the plurality of gusset plates. The top plate may be removed in order to gain access to the oil absorption unit 33 or the toxic pollutant filter 26, as shown in FIG. 3.

In view of the foregoing, it can be seen that waste water coming in the direction of arrows 30 along the roadway 18 is introduced to the apparatus 10 via the elongated slots 15 in the first or inclined ramp 12. The flow of water is processed through the cavity under top plate 11 and across the toxic filter unit 26 and the oil absorption unit 33. Heavy solids which are carried by the flow will drop via gravity into the units. Also, oil has a tendency to rise to the surface of the water so that the water underneath is cleaner. The heavier oil deposits will be absorbed into the material of the absorption unit 33 while the clean water will exit the apparatus via the exit slots 14. It is also seen that the areas between adjacent gussets are occupied by both the oil absorption units 33 and the toxic pollutant filters 26. Once the units have been saturated with either oil absorption or pollutant residue, the top plate 11 is removed and the units are withdrawn and properly disposed of after being replaced with new units.

Preferably, the apparatus may be constructed of a polyurethane exterior and a polypropylene interior and a matting for absorption of oil may be used while the filter may employ a close mesh or fabric material for the toxic material which will absorb a combination of oil and other particles in the liquids. The apparatus serves as a speed bump and is a storm water, oil absorption unit capable of retaining suspended solids, filtering out pesticides, herbicides, synthetic organ compounds and other pollutants. The apparatus serves as a catch basin which will retain trash and suspended solids, while oil particles are absorbed and pesticides and other toxic pollutants are filtered.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention

What is claimed is:

1. A petroleum and toxic waste separator comprising:
   a support base having an incline portion, a declining portion, and with a central space defined between said incline and declining portions wherein said central space separates said incline portion from said declining portion;
   a top plate carried on said support base between said incline and declining portions;
   an inclining slotted first ramp supported on said incline portion of said support base;
   a declining slotted second ramp supported on said declining portion of said support base;
   drainage water cleansing units disposed under said top plate;

said cleansing units disposed under said top plate include at least one petroleum product filter separator and a toxic contaminant filter separator for receiving drainage water from said first ramp; and said first ramp constituting an inlet ramp for receiving drainage water and conducting drainage water to said cleansing units for discharge via said second ramp.

2. The petroleum and toxic waste separator defined in claim 1 wherein:

said support base is comprised of a plurality of spaced and parallel gussets with each gusset having a central recess for receiving said top plate and said central recess separating said incline portion and said declining portion.

3. The petroleum and toxic waste separator defined in claim 2 wherein:

said first ramp is elongated with a plurality of slots serving as inlets for conducting drainage water directly into said petroleum product separator and said toxic contaminant separator and said second ramp is elongated with a plurality of slots serving as outlets for conducting drainage water from said cleansing units.

4. The petroleum and toxic waste separator defined in claim 3 wherein:

said top plate, said first ramp and said second ramp are removably supported on said plurality of gussets for selectively exposing said cleansing units.

5. The petroleum and toxic waste separator defined in claim 4 including:

an elongated ground plate supporting said plurality of gussets.

6. The petroleum and toxic waste separator defined in claim 5 wherein:

said cleansing units include a layer of oil absorption material for collecting heavy oil deposits from drainage water and further including a layer of toxic pollutant filters for collecting pollutant compounds from drainage water.

7. A cleansing apparatus for cleaning and filtering roadway drainage water comprising:

a support base disposed on a roadway in the path of flowing drain water;

a top plate removably carried on said support base elevated from the roadway;

a first inclined panel supported on said support base having a plurality of inlet openings for receiving drain water for conducting drain water beneath said top plate;

a second declined panel supported on said support base having a plurality of outlet openings for discharging drain water from beneath said top plate; and a petroleum separator and a toxic waste separator disposed between said first inclined panel and said second declined panel immediately beneath said top plate for separating pollutants and contaminants from drain water.

8. The cleansing apparatus defined in claim 7 wherein:

said support base includes a plurality of gussets elevating said top plate and a selected side of said first panel and said second panel above the roadway.

9. The cleansing apparatus defined in claim 8 wherein:

said gussets include upper edges supporting said first panel and said second panel at a declining angle from said top plate to the roadway.

10. The cleansing apparatus defined in claim 9 wherein:

said petroleum separator includes a layer of petroleum absorption material and said toxic waste separator includes a layer of toxic contaminant absorption material.

11. A petroleum and toxic waster separator comprising:

a support base;

a top plate carried on said support base;

an inclining slotted first ramp supported on said support base;

a declining slotted second ramp supported on said support base;

drainage water cleansing units disposed under said top plate;

said first ramp constituting an inlet ramp for receiving drainage water and conducting drainage water to said cleansing units for discharge via said second ramp;

said support base including a plurality of spaced and parallel gussets with each gusset having a central recess for receiving said top plate and said central recess separating an incline portion for supporting said first ramp and a declining portion for supporting said second ramp; and wherein said drainage water cleansing units include at least one petroleum product filter and a toxic contaminant filter for receiving drainage water from said first ramp.

* * * * *